3,068,277
CARBAMIC ACID ESTERS AND MEANS OF
PRODUCING THE SAME
John Frederick Cavalla, Isleworth, and Derek Charles Bishop, Camberley, England, assignors to Parke, Davis & Company, Detroit, Mich., a corporation of Michigan
No Drawing. Filed May 15, 1961, Ser. No. 109,869
Claims priority, application Great Britain June 3, 1960
3 Claims. (Cl. 260—482)

This invention relates to novel carbamic acid ester compounds and to means for obtaining the same. More particularly, this invention relates to carbamic acid esters of trichloromethyl pentynols of formula,

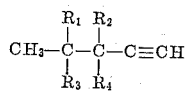

and to means of producing the same; where one of $R_1$ and $R_2$ represents a trichloromethyl group and the other represents hydrogen, and one of $R_3$ and $R_4$ represents a hydroxyl group and the other represents hydrogen, said hydroxyl and trichloromethyl groups being substituted at the same carbon atom.

For the production of the novel carbamic acid ester compounds in accordance with the invention, a trichloromethyl pentynol having the above formula is reacted with an alkali metal amide, alkali metal hydride or alkaline earth metal hydride, the resulting metal salt is reacted with phosgene to provide the corresponding chloroformate and the latter is reacted with ammonia. The reaction between the pentynol and amide or hydride is conveniently carried out at room temperature or lower temperature, preferably below 25° C., in the presence of an inert organic solvent. Among the solvents which are suitable for the reaction may be mentioned hydrocarbons such as benzene, toluene, xylene and petroleum ether, ethers such as dioxane, tetrahydrofuran and diethyl ether, and chlorinated hydrocarbons such as carbon tetrachloride and chloroform. As examples of suitable alkali metal amides may be mentioned sodium amide and potassium amide. Among the hydrides of alkali metals and alkaline earth metals which are suitable may be mentioned sodium hydride, potassium hydride, calcium hydride, and lithium hydride. Sodium amide or sodium hydride is preferred for reasons of economy and for ease of reaction. For convenience the amide or hydride is employed in excess. The reaction mixture containing the metal salt product need not be purified and can be used directly for the next step of the process, it being unnecessary to isolate the product for further processing.

The reaction between the metal salt product and phosgene is carried out in an inert organic solvent of the type mentioned above at room temperature or lower temperature, preferably between 0 and 20° C. For best results phosgene is employed in excess. For the subsequent step of the process the resulting reaction mixture containing the chloroformate product, preferably after separation of excess phosgene, can be used directly without purification or isolation of the product. The reaction between the chloroformate product and ammonia is conveniently carried out by saturating the reaction mixture with ammonia gas at room temperature or lower temperature, preferably between 0 and 15° C. For best results ammonia is employed in excess. Alternatively, aqueous ammonia may be employed for the reaction. The desired carbamic acid ester product is conveniently isolated from the reaction mixture by concentrating the same under vacuum and recovering the residual product by crystallization from a suitable solvent.

The products of the invention possess sedative, hypnotic and anesthetic properties and hence can be used as sedative or hypnotic agents or as agents for the depression of the central nervous system. The products are administered by the parenteral or oral routes. Advantageously, the products are relatively free of side effects, particularly the toxic effect which is known as pre-hypnotic excitation often encountered with substances having CNS-depressant properties. Respiration is not significantly affected during the stage of general anesthesia.

The invention will now be described more particularly with reference to the following illustrative examples:

*Example 1*

Sodium hydride (9.6 g. as a 50% dispersion in oil) was washed free of oil by decantation with dry benzene in 5 portions of 50 ml. each and added as a dispersion in 250 ml. of dry benzene to a stirred solution of 33.3 g. of 2-trichloromethyl-pent-4-yn-2-ol in 750 ml. of dry benzene keeping the temperature below 25° C. with external cooling. The clear solution thus obtained was decanted from the excess of sodium hydride and the latter washed with two 50-ml. portions of dry benzene. The combined benzene solutions were added dropwise to a vigorously stirred solution (300 ml.) of phosgene (12½% w./v.) in toluene while maintaining the temperature between 15 and 20° C. The reaction mixture was allowed to stand at room temperature for 16 hours and was then subjected to distillation under reduced pressure for the removal of excess phosgene. The residual mixture was then cooled to 0° C. and then treated with ammonia gas in excess with vigorous stirring for one hour while maintaining the temperature between 10 and 15° C. The reaction mixture was filtered, the filter cake was washed with three 50-ml. portions of benzene, and the combined filtrate and washings subjected to distillation under vacuum (0.8 mm.). The residual product, 2-trichloromethylpent-4-yn-2-ol, carbamic acid ester, was purified by dissolving in benzene, boiling the benzene solution over activated charcoal, filtering, concentrating the filtrate, treating the concentrate with hot n-hexane (100 ml.) and ether (10 ml.) at 40° C. and cooling the mixture. The resulting product was a microcrystalline solid; M.P. 56 to 57° C. Dilution of the mother liquors with n-hexane and cooling gave a further quantity of the crystalline product.

In the above example the required carbamate can be obtained in comparable yields if sodium amide (7.8 g.) is substituted for the sodium hydride.

*Example 2*

A solution of 20.1 g. of 3-trichloromethyl-pent-4-yn-3-ol in 50 ml. of dry toluene was treated with 5.8 g. of sodium hydride as a 50% dispersion in oil while maintaining the temperature between 15 and 26° C. until 3.35 liters of hydrogen were evolved. The reaction mixture was added slowly to a vigorously stirred solution of phosgene (12½% w./v.) in 200 ml. of toluene while maintaining the temperature between 0 and —5° C. The resulting solution was added over a period of 5 minutes with stirring to 100 ml. of aqueous ammonia (specific gravity 0.880) and the resulting mixture was then warmed to room temperature and separated. The aqueous layer was washed with two 50-ml. portions of ether and the combined organic layers were washed with three 100-ml. portions of water and 50 ml. of 2 N aqueous sulfuric acid. The resulting solution was dried over sodium sulfate, filtered and concentrated under vacuum (15 mm.). The residual product, 3-trichloromethyl-pent-4-yn-3-ol, carbamic acid ester, was taken up in n-hexane, treated with decolorizing charcoal, filtered and crystallized; M.P. 94–95° C.

In the above example the required carbamate can be obtained in comparable yields if sodium amide (4.7 g.) is substituted for the sodium hydride.

The starting material for the above procedure was prepared as follows:

To an ice cold solution of ethyl magnesium bromide prepared from 114.5 g. of ethyl bromide and 24 g. of magnesium in one liter of ether was added 201 g. of dry cadmium chloride, and the mixture was stirred at room temperature for one hour. The resulting suspension was added with vigorous stirring over a period of 40 minutes at 0 to 10° C. to 163 of trichloroacetyl chloride in 40 ml. of ether. After the initial reaction, the mixture was stirred at room temperature for one hour and then treated with 400 ml. of 2 N sulfuric acid. The organic layer was separated, washed with water, dried over magnesium sulfate, filtered, and concentrated under vacuum. The fraction boiling at 45–54° C./12 mm. consisting of 1,1,1-trichlorobutane-2-one was collected.

1,1,1-trichlorobutane-2-one (36 g.) in 20 ml. of tetrahydrofuran was added dropwise with stirring over ½ hour to a solution of ethynyl magnesium bromide (prepared from 36 g. of ethynyl bromide) in 400 ml. of tetrahydrofuran. The mixture was brought to room temperature and stirring was continued for one hour. The reaction mixture was treated with 500 ml. of saturated aqueous ammonium chloride at 0° C., and the organic layer was separated and fractionally distilled. 3-trichloromethyl-pent-4-yn-3-ol was collected as the fraction distilling at 91–93° C./16 mm.

While the present invention has been described in considerable detail, it will be realized by those skilled in the art that such detail may be varied widely without departing from the spirit of the invention as defined in the following claims.

What we claim is:

1. Carbamic acid esters of trichloromethyl pentynols of formula

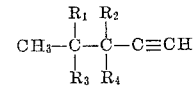

where one of $R_1$ and $R_2$ represents a trichloromethyl group and the other represents hydrogen, and one of $R_3$ and $R_4$ represents a hydroxyl group and the other represents hydrogen, said hydroxyl and trichloromethyl groups being attached to the same carbon atom.

2. 2 - trichloromethyl-pent-4-yn-2-ol, carbamic acid ester.

3. 3 - trichloromethyl - pent - 4 - yn - 3 - ol, carbamic acid ester.

References Cited in the file of this patent

UNITED STATES PATENTS

| | | |
|---|---|---|
| 1,658,231 | Dox et al. | Feb. 7, 1928 |
| 2,814,637 | Marshall et al. | Nov. 26, 1957 |